US007577912B2

(12) United States Patent
Govindan et al.

(10) Patent No.: US 7,577,912 B2
(45) Date of Patent: Aug. 18, 2009

(54) SUGGESTIVE FORM FACTORS

(75) Inventors: Balaji Govindan, Chennai (IN);
Ramesh Gangadhar Bachiraju,
Bangalore (IN)

(73) Assignee: SAP AG, Walldorf (DE)

( * ) Notice: Subject to any disclaimer, the term of this patent is extended or adjusted under 35 U.S.C. 154(b) by 645 days.

(21) Appl. No.: 10/402,443

(22) Filed: Mar. 27, 2003

(65) Prior Publication Data
US 2004/0189670 A1   Sep. 30, 2004

(51) Int. Cl.
*G06F 3/00* (2006.01)
(52) U.S. Cl. .................. 715/746; 715/744; 715/762; 715/765
(58) Field of Classification Search ......... 715/517–525, 715/762, 744, 746, 747, 764, 765
See application file for complete search history.

(56) References Cited

U.S. PATENT DOCUMENTS

| 5,862,297 | A * | 1/1999 | Timmermans | 386/70 |
| 5,969,717 | A * | 10/1999 | Ikemoto | 715/762 |
| 6,717,556 | B2 * | 4/2004 | Asahi et al. | 345/1.1 |
| 2002/0099456 | A1 * | 7/2002 | McLean | 700/83 |
| 2002/0126142 | A1 * | 9/2002 | Hodgkinson | 345/719 |
| 2002/0191031 | A1 * | 12/2002 | Ricard | 345/838 |
| 2003/0137539 | A1 * | 7/2003 | Dees | 345/762 |
| 2004/0027378 | A1 * | 2/2004 | Hays et al. | 345/763 |
| 2004/0125140 | A1 * | 7/2004 | Bell et al. | 345/765 |
| 2004/0163046 | A1 * | 8/2004 | Chu et al. | 715/517 |

* cited by examiner

*Primary Examiner*—Ba Huynh
(74) *Attorney, Agent, or Firm*—Kenyon & Kenyon LLP (57) ABSTRACT

A development environment and/or method for generating a user interface for a plurality of computing devices. The development environment and/or method may include a user interface modeling process for configuring information representing display capabilities of computing devices. The display capabilities may include a desired screen size parameter. As a function of the information configured, indicators are displayed or implemented to represent the respective screen size parameters of the computing devices. The development environment and/or method may also include an application generation process for comparing the information of the display capabilities of the computing devices with the information indicating placement location of a user interface component. If the information indicating placement location of the user interface component complies with a display capability, then the user interface component is stored in a database. The database may be stored in repository; a generator is used to read the database to generate the application requested by one of the computing devices.

16 Claims, 7 Drawing Sheets

SUGGESTIVE FORM FACTORS

FIELD OF THE INVENTION

The present invention relates to the area of software. In particular, the present invention relates to a development environment for generating a user interface for a device.

BACKGROUND INFORMATION

When an application developer models a user interface for a user device, the modeling tool provides a modeling workspace regardless of the target user device. Thus, it can happen that the developer prepares a user interface for a larger target screen than desired. For example, a developer may forget the dimensions of the target screen and incorrectly treat the design workspace as the target screen size. Sometimes the developer does not know what target user device will be used, and thus cannot guarantee that the user interface will be useful to the target user device. A user interface developed for a larger screen than the actual target screen may not run or may be displayed incorrectly. This problem could be exacerbated in the situation where a company wishes to use the same user interface application on multiple devices used by its employees. For example, a sales employee might be working remotely on a laptop from a hotel, while another sales employee works offline via a pocket PC at a client site, and another sales employee works from a desktop computer at the company site. The screens of those three devices differ significantly in dimensions, and a user interface modeled for the desktop might not work with, e.g., the pocket PC.

To solve such a situation, a developer might decide to always design its user interface to fit the smallest screen possible. Of course, this can potentially waste large amounts of screen space, as well as decrease the amount of user interface components for the user interface. This could also affect the way in which user interface components are positioned on available screen space. For example, if a developer knows that its client may use laptop computers and PDAs, if the developer develops the user interface to work on the PDA screen, and the client uses the user interface solely for laptop computers, then much of the laptop's available screen space would be wasted.

SUMMARY OF THE INVENTION

Exemplary embodiments, systems and/or methods of the present invention provide for designing a user interface for a software application designed to run on multiple computing devices with heterogeneous display capabilities.

Further exemplary embodiments and/or exemplary methods of the present invention provide for designing an application for at least one generic or undetermined target computing device.

Further exemplary embodiments and/or exemplary methods of the present invention provide a user interface modeling tool which stores information regarding the display capabilities of a plurality of computing devices. The display capabilities may include a form factor which represents an available display size of the computing device. The modeling tool may display at least one indicator corresponding to a display capability of each computing device.

Further exemplary embodiments and/or exemplary methods of the present invention provide that the at least one indicator may represent a form factor which is displayed as, e.g., a graphics outline or audio outline corresponding to the available screen area of each respective computing device.

The form factors may be configurable, i.e., not fixed, and/or dynamically changeable to accommodate new devices and the new screen size requirements of the new devices. In further exemplary embodiments and/or exemplary methods, the indicators of the form factors may provide the developer with a tangible feel for the possible user interface options, e.g., screen size, at the time of development. This feature may allow a developer to use the screen space of the various devices in a more optimal fashion.

Further exemplary embodiments and/or exemplary methods of the present invention provide that the modeling tool receives information corresponding to the design of the user interface. And, in a further embodiment, this information includes parameters representing the desired placement of user interface components.

Further exemplary embodiments and/or exemplary methods of the present invention provide a process for generating a user interface metadata file for the computing devices. During an application generation process, for each computing device, the modeling tool may compare the design information with the respective device capabilities information and generate a corresponding user interface metadata file.

Further exemplary embodiments and/or exemplary methods of the present invention provide that the information concerning the user interface components and their placement on the modeling workspace, and, in some embodiments, the form factors too, are stored as one metadata file. Then, upon request by a device, e.g., PDA, or otherwise, a generator reads the metadata and sends the appropriate application to the appropriate computing device, e.g., the requesting computing device.

DETAILED DESCRIPTION

The present invention provides a method and system to allow a developer, in design-time, to model a user interface which may be used for a plurality of different computing devices.

Figure 1A:
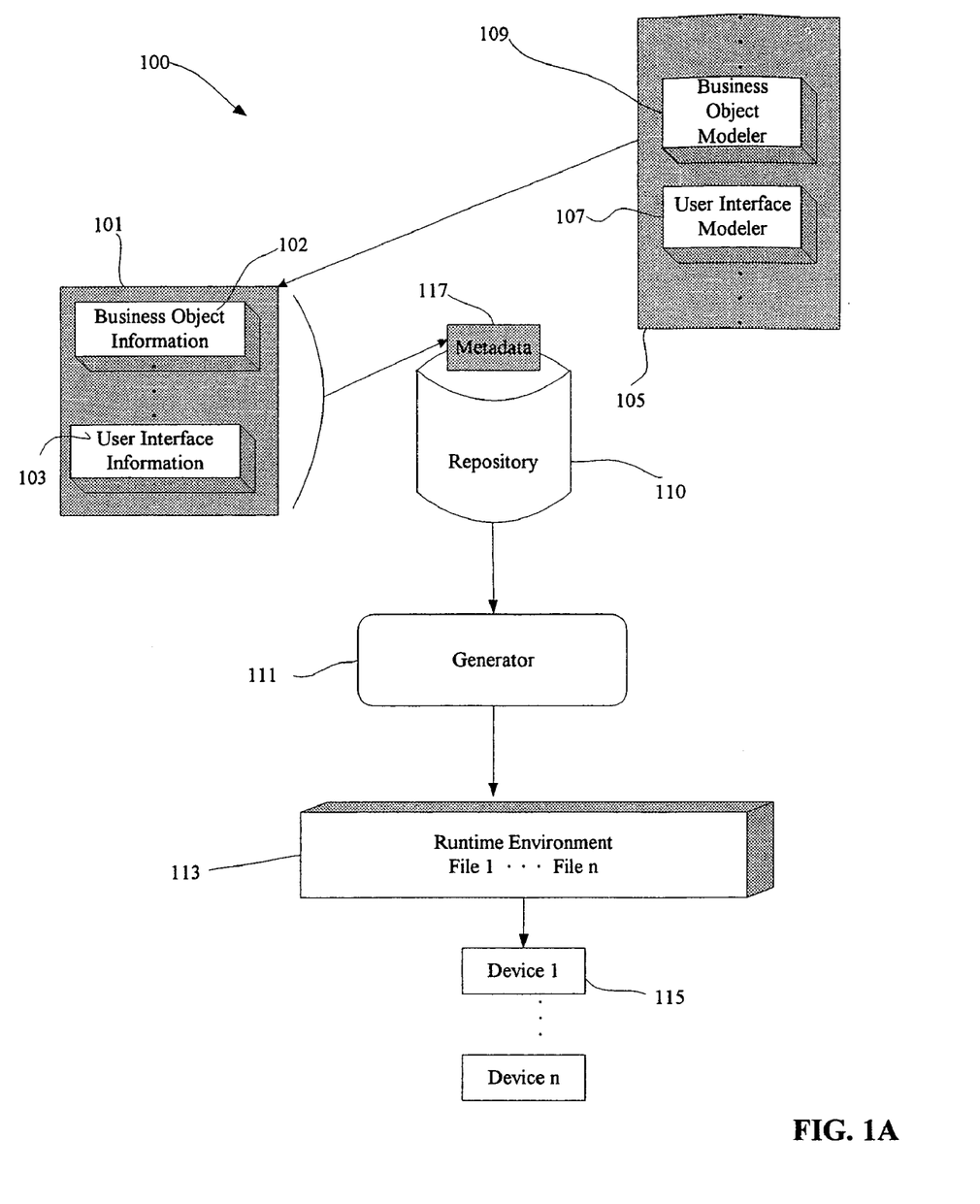
FIG. 1A depicts an exemplary relationship between an embodiment of the present invention and an applications engine.
Figure 1B:
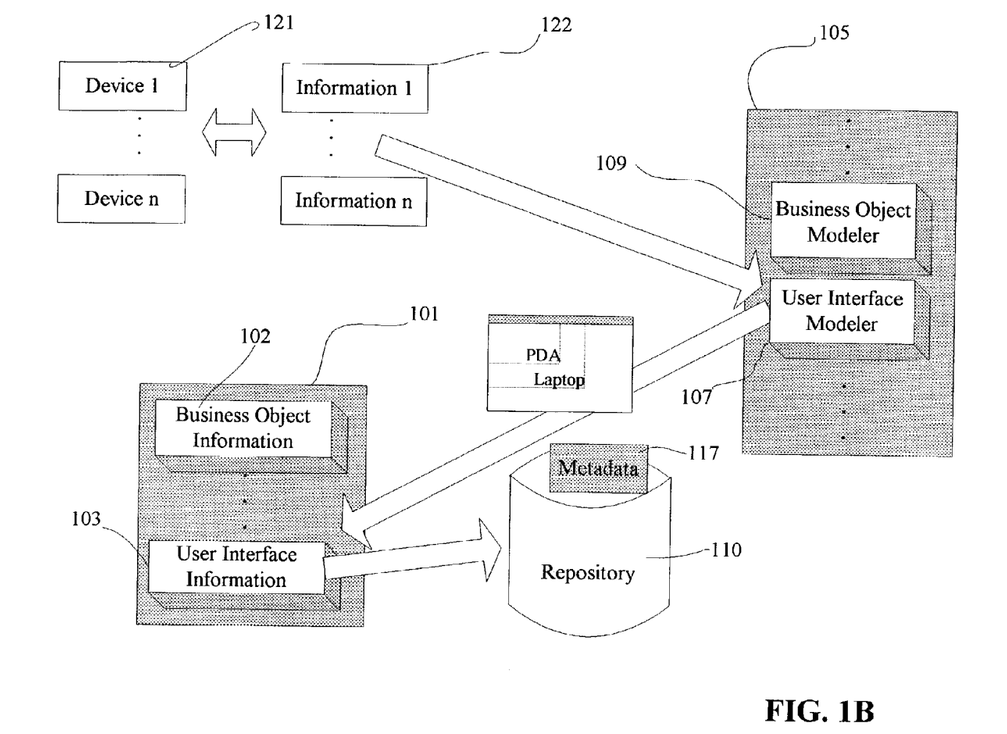
FIG. 1B depicts an exemplary embodiment of the present invention in accordance with FIG. 1A.

FIGS. 1A and 1B illustrate an exemplary relationship between an application framework and a system for generating a user interface according to an embodiment of the present invention. Users (not shown here) working remotely from multiple devices 115, e.g., a laptop computer and a PDA (personal digital assistant), can use the same generic user interface created by the developer. The developer may define particular custom user interfaces so that while a laptop screen will include the same user interface as available on the PDA, the laptop screen also shows additional tools not perhaps desired for use on the PDA. FIG. 1A shows a repository 110, a database, which stores metadata 117, another database. The metadata 117 specifies an application in a generic manner so that an application may be generated from that specific metadata. That is, the metadata associated with the user interface generated by the present invention is stored in the repository 110 so that a generator 111 may read the metadata 117 to provide a user interface to mobile devices 115 via their runtime environment file 113. The repository content may support configuration and logistics issues. During generation, the metadata is generated to be an application which may then be stored as file(s) and/or object(s). That is, e.g., an application generator may read the metadata to generate a requested application. The application metadata in the repository may have sufficient information in a generic way to define behavior of any application. During runtime, the application with its file(s) and object(s) is used.

In this exemplary embodiment, the design time framework provides various modelers 105 for use in the framework, including a business object modeler 109, user interface modeler 107, and other available modelers. The various modelers 105 are used to generate information 101 which may be stored in the repository 110 for later use. The information 101 includes at least business object information 102 and user interface information 103. The business object modeler 109 provides business object information. The user interface modeler 107 processes a user interface to be user interface information 103, which can then be saved, as in this example, as metadata 117 in the repository 110 for future use by a device, e.g., a mobile device. The interface modeler 107 uses at least four forms: application (which can contain multiple business components); business components (which can contain multiple tile sets); tile sets (which can contain up to six tiles); and tiles.

FIG. 1B illustrates exemplary interaction in an applications framework when using the system according to the present invention. In an embodiment of the present invention, a certain device or tool may be desired for use by later users, e.g., via a PDA, etc., and thus be included in the user interface. The attending information (1 . . . n) 122 to the certain device or tool (1 . . . n) 121 is then associated with the user interface application information using the user interface modeler 107. Once all desired information corresponding to devices/tools/business objects/user interface components is included in the user interface, this user interface information 103 is then stored, for example, as metadata 117 for use.

A further exemplary embodiment and/or method of the present invention provides a design time environment for generating a first user interface for a first computing device and a second user interface for a second computing device. A user interface modeling process may include configuring a first information representing a first display capability of the first computing device, wherein the first display capability includes a first view size; and configuring a second information representing a second display capability of the second computing device, wherein the second display capability includes a second view size. As a function of the first information and the second information, a first indicator representing the first view size and a second indicator representing the second view size may be displayed. The indicators may be gridlines visible on the modeling surface. A third information indicating a desired placement of a user interface component may be also configured. An application generation process may include comparing the first information with the third information, wherein if the desired placement of the user interface component complies with the first display capability, storing the third information in a first database, or metadata, wherein the first database may be used to generate the first user interface for the first computing device, and comparing the second information with the third information, wherein if the desired placement of the user interface component complies with the second display capability, storing the third information in a second database, or metadata, wherein the second database may be used to generate the second user interface for the second computing device, comparing the first information with the second information to determine an area where the first display capability is redundant with the second display capability and comparing the area with the third information, wherein if the desired placement of the user interface component complies with the area, storing the third information in a third database, or metadata, wherein the third database may be used to generate a generic user interface for the first computing device and the second computing device. The denotations of the different informations, etc., as "first," "second," and "third" are for illustrative purposes only. Further, as noted herein, the exemplary embodiments and/or exemplary methods of the present invention can be used for many different types of devices and screens, including, but not limited to, laptop(s), PDA device such as a Pocket PC, Half VGA and Full VGA devices, mobile telephone(s), electronic device(s), desktop computer(s), and server(s). And, more or fewer metadata can be stored and later generated into applications.

Further exemplary embodiments and/or exemplary methods of the present invention may provide that the first display capability and the second display capability are each configured by a stored screen size parameter. Such stored screen size parameters are those screen dimensions of devices supported by the runtime application. The stored screen size parameters may not be the actual screen sizes of their specific devices, but will be a relative portion of the screen where the tile will be shown, since one may customize that actual screen size to leave some available screen space, e.g., to account for a device-caption and/or a device-status bar. See, e.g., FIG. 1B, discussed below.

Figure 2:
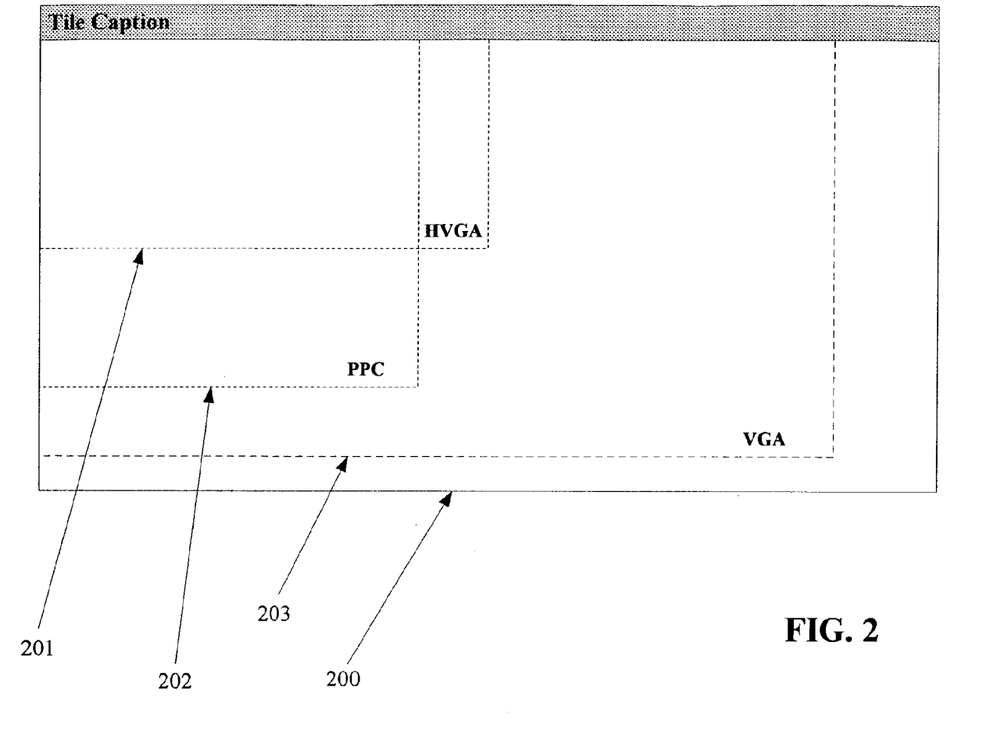
FIG. 2 depicts an exemplary tile according to the present invention.

FIG. 2 illustrates an exemplary tile according to an embodiment of the present invention. The tile 200 is an exemplary modeling workspace a developer may see when preparing the user interface for a mobile device user. Specifically, according to an embodiment of the present invention, a developer may specify in design time the option to design a user interface for one or more devices, e.g., a pocket personal computer (PPC), a Half-VGA (HVGA), a Full VGA (VGA being Video Graphics Array) or a laptop computer. That is, exemplary embodiments of the present invention provide available terminology of standard target devices, e.g., PDA. Thus, from an applications menu, the developer can specify already stored dimensions for available devices, and/or the developer may indicate a desired screen size for another device. The developer can customize a screen size to allow for menu bars, tile captions, etc. When the developer has specified these dimensions, the developer will be able to view on its modeling workspace the different dimensioned screens 201, 202, 203 of the target devices. The dimensioned screens may be shown on the development workspace as gridlines or another indicator such as a device type information (e.g., PPC, Laptop), a size information (e.g., 320×240, 800×600), an audio signal, a voice alert, a screen background color, a screen background shade, or a combination of these indicators. As indicated above, those screen size dimension indicators are termed herein as form factors. And, since the form factors denoting the screen dimensions would only be suggestive, they will not force a developer to model for a single device. Instead, these suggestive form factors can allow a developer to envision the dimensions of a plurality of devices simultaneously while developing one or more user interfaces. And, such will allow a developer to determine the overlapping area of the different intended target devices. In further embodiments of the present invention, the developer can then devise a generic user interface which can be used on one or more of those intended devices.

Further exemplary embodiments and/or exemplary methods of the present invention provide suggestive form factors which are built into the actual modeling tool, apparent in development time. The suggestive form factors are not a separate tool window. Further, the suggestive form factors can be used for any modeling tool, designer and/or studio, particularly those which target more than one device. The suggestive form factors can also be used for any internal media which convey a user interface concept, e.g., a print-out of a user interface form.

Figure 3:
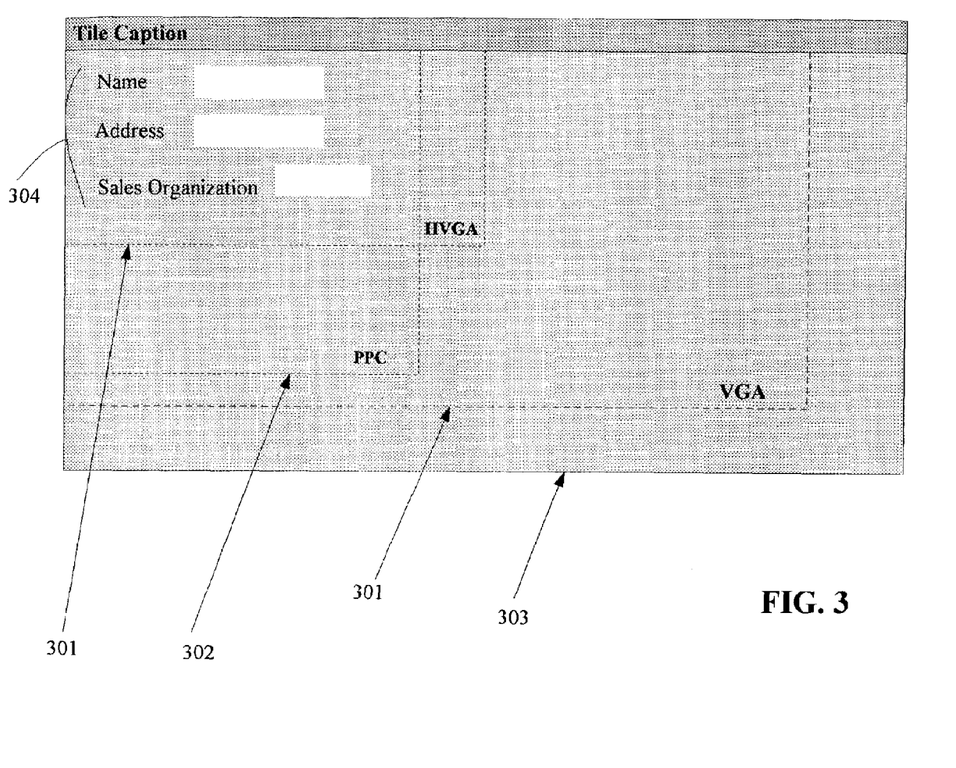
FIG. 3 depicts another exemplary tile according to the present invention.

FIG. 3 illustrates another exemplary tile according to an embodiment of the present invention. The tile 300 shows the gridlines for a PPC 302, a VGA 303 and a HVGA 301, as seen by a developer in design time. Further, a set of gridlines could be set and stored for any desired view of the user interface, or in fact be associated with a device having coordinates not pre-stored and available via the modeling menu. In this exemplary embodiment, certain information or tools or business objects 304 have been placed in the intersecting area of all the gridlines. This means that the resulting user interface generated should be able to run on any of the three devices, with all placed information 304 available to the users.

Figure 4:
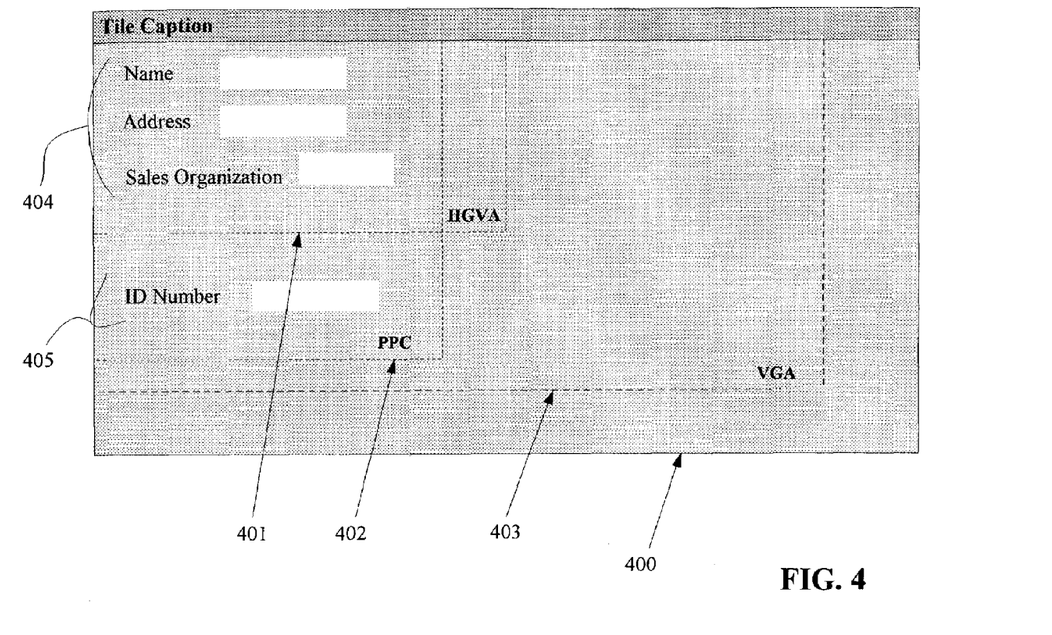
FIG. 4 depicts another exemplary tile according to the present invention.

FIG. 4 illustrates another exemplary tile according to an embodiment of the present invention. The tile 400 shows the gridlines for a PPC 402, a VGA 403 and a HVGA 401, as seen by a developer in design time. In this exemplary embodiment, certain information/tools/business objects/user interface components 404 have been placed in the intersecting area of all the gridlines. This means that the resulting user interface generated should allow that all placed information 404 is available on any of the three devices. Another user interface component 405 has been placed in an area covered by only two of the intended target devices—the PPC and the VGA. Thus, that user interface component 405 will be available to those mobile device users, but not to the user having the HVGA screen, since the information is located outside the specified screen size. Various user interfaces can be stored from this example for use by the mobile devices. For example, a "generic" user interface can be saved which indicates availability for use all three mobile devices. In fact, a developer may desire to only save the information that can be used by all three mobile devices and the developer can have, either automatically or manually, any remaining user interface possibilities either purged and not saved for use, or saved as a separate database in the repository (thus, causing discarding the generator's responsibility). Or, a separate interface can be saved for each device or each set of devices, e.g., thereby allowing a user to have user interface component 405 available on the PPC and/or the VGA.

Figure 5:
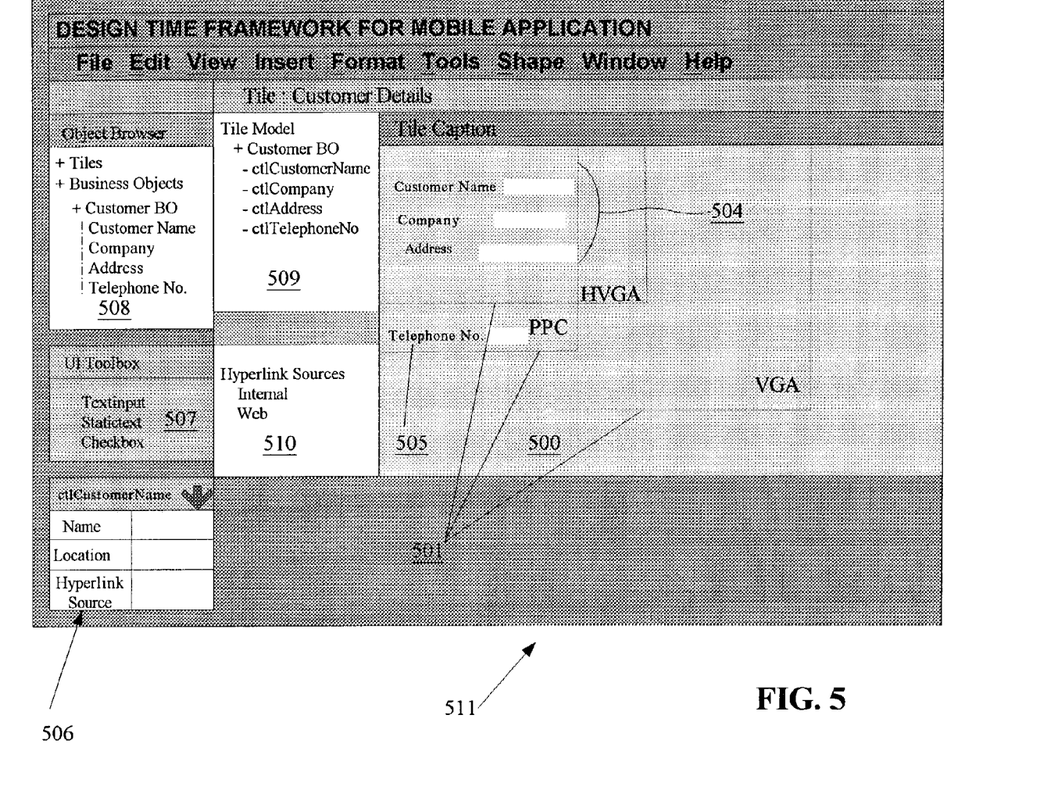
FIG. 5 depicts an exemplary computer screen view with various tiles according to the present invention.

FIG. 5 illustrates an exemplary computer screen view 511 with various tiles according to the present invention. Some of those tiles are: a modeling workspace 500; a list of business objects, etc. 508; a control toolbox 507; a specification box 506; a hyperlink box 510; and a listing box 509. In FIG. 5, the modeling workspace is shown having gridlines 501 indicating the suggestive form factors. The developer may place the user interface components 504, 505, e.g., business objects/controls/etc., dragged-and-dropped from other tiles, at any place on the workspace screen. In a further embodiment, if the developer places the common user interface components on a resulting common region or area, i.e., where all screens intersect, and places less desired user interface components on the outer regions, e.g., outside the gridlines, so that an eventual runtime of the target devices would intelligently take or leave the elements based on their positioning. In further embodiments, if the developer places the user interface components outside all the gridlines, then: 1) no notice to the developer will occur; 2) an error will alert the developer of the improper placement; 3) either upon exiting or upon initial placement, the user interface component(s) will be automatically placed, according to fit and the application's whims; 4) a default information will be saved in the repository containing all user interface components placed on the modeling workspace; and/or the user interface component(s) will be discarded and not included on any of the saved information.

The user interface components 504, 505 may, among other things, include basic data bound controls, modification, save, delete, new, anchor mapping, and hyperlink support. And, the developer may place a user interface component, in design time, by a drag-and-drop of the user interface component from, e.g., a toolbox, to the modeling surface.

The specification box tile 506 may be used by a developer to name and set properties of the user interface components located on the modeling workspace. The specification box tile 506 may also indicate actual pixel placement of the user interface component located on the modeling workspace 500. Note that in some embodiments of the present invention, pixel level positioning of user interface components or elements based on the gridlines of the suggestive form factors is possible. Further, the specification box 506 can associate or link a placed user interface component with a hyperlink to another tool, function, etc. Any naming or such of a user interface component in the specification box 506 automatically updates the data 504, 505 on the modeling workspace to reflect the inputs. Likewise, the listing in the listing box tile 509 is also updated in response to any changes made in the specification box tile 506. The listing box tile 509 shows a list of any the user interface components, i.e., the controls and business objects, etc., and any hyperlinks associated thereto, on the modeling workspace 500. The hyperlink box tile 510 shows any associable hyperlinks available. The business objects tile 508 includes business objects, among other things, which can be dragged-and-dropped onto the modeling workspace 500. Such a change on the modeling workspace 500 is automatically reflected in the listing box tile 509. And, the business object or other user component placed can be named and such by the specification box tile 506. Likewise, the control toolbox tile 507, includes controls which can be dragged-and-dropped on the modeling workspace 500. The control toolbox 507 may include, for example, static text control, text input control, check box, button control, and combo input control, and command bar control including menu and toolbar, with image, text, button, and modeling support. The various tiles allow the developer to more easily configure the intended user interface screens. Other exemplary tiles or views used by the developer, depending on the framework of the system, may be used which may include additional, or fewer, useful views and/or resources for the developer.

Figure 6:
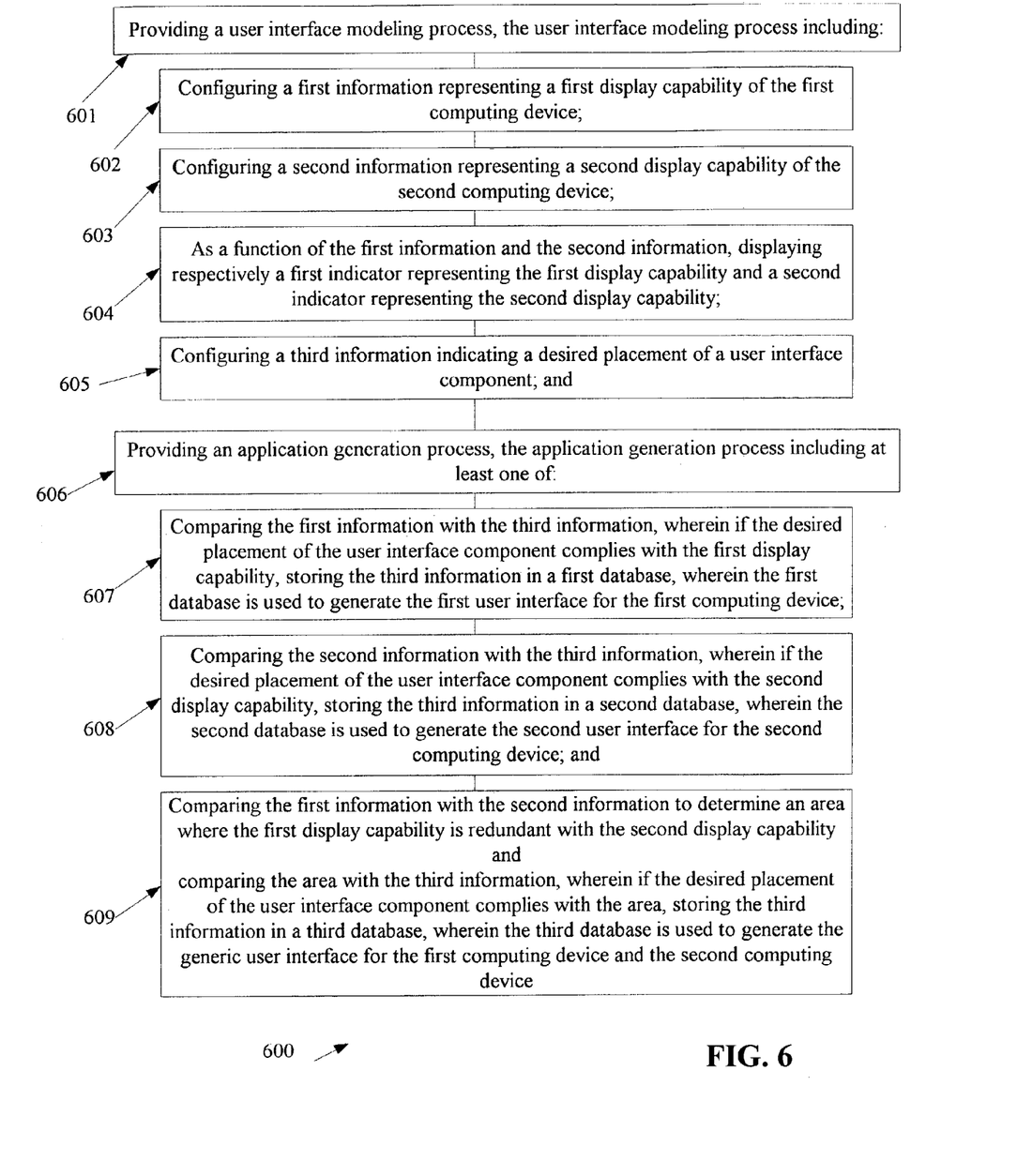
FIG. 6 is a flowchart depicting a series of steps for generating a user interface for a computer device according to the present invention.

FIG. 6 is a flowchart depicting a series of steps for generating a user interface for a computer device according to the present invention. These steps 600 are grouped into two subprocesses: providing a user interface modeling process 601 and providing an application generation process 606. Providing a user interface modeling process 601 includes the steps of: configuring a first information representing a first display capability of the first computing device 602; and configuring a second information representing a second display capability of the second computing device 603. As a function of the first information and the second information, the modeling process displays, respectively, a first indicator representing the first display capability and a second indicator representing the second display capability 604. The first and second indicators may be at least one of gridlines, audio signal, background color, screen boundary, etc. The process then configures a third information indicating a desired placement of a user interface component 605. The user interface component could be business objects, tools, data, or any number of items that can be included on a screen and generated as a user interface. The application generation process 606 includes at least one of: comparing the first information with the third information, wherein if the desired placement of the user interface component complies with the first display capability, storing the third information in a first database, wherein the first database is used to generate the first user interface for the first computing device 607; comparing the second information with the third information, wherein if the desired placement of the user interface component complies with the second display capability, storing the third information in a second database, wherein the second database is used to generate the second user interface for the second computing device 608; and comparing the first information with the second information to determine an area where the first display capability is redundant with the second display capability and comparing the area with the third information, wherein if the desired placement of the user interface component complies with the area, storing the third information in a third database, wherein the third database is used to generate the generic user interface for the first computing device and the second computing device 609.

What is claimed is:

1. A development environment for generating a first user interface for a first computing device and a second user interface for a second computing device comprising:
   a user interface modeling process, the user interface modeling process including:
   receiving a first information representing a first display capability of the first computing device, wherein the first display capability includes a first view size;
   receiving a second information representing a second display capability of the second computing device, wherein the second display capability includes a second view size;
   as a function of the first information and the second information, displaying respectively a first indicator representing the first view size and a second indicator representing the second view size, where the first and second indicators are concurrently superimposed to show an overlapping region and a non-overlapping region of the first and second display capabilities when such regions exist; and
   receiving a third information indicating a desired placement of a user interface component; and
   an application generation process, the application generation process including:
   comparing the first information with the third information, wherein if the desired placement of the user interface component complies with the first display capability, storing the third information in a first database, wherein the first database is used to generate the first user interface for the first computing device; and
   comparing the second information with the third information, wherein if the desired placement of the user interface component complies with the second display capability, storing the third information in a second database, wherein the second database is used to generate the second user interface for the second computing device.

2. The development environment of claim 1, wherein the application generation process further includes:
   for third information indicating that the desired placement is in the overlapping region, storing the third information in a third database, wherein the third database is used to generate a generic user interface for the first computing device and the second computing device.

3. The development environment of claim 2, wherein the displaying of the first indicator and the second indicator is manifested as at least one of: a gridline; a device type information; a size information; an audio signal; a voice alert; a screen background color; a screen background shade; and a combination of these indicators.

4. The development environment of claim 3, wherein the first display capability and the second display capability are each configured by a respective at least one stored screen size parameter.

5. The development environment of claim 3, wherein the desired placement of the user interface component is positionable at pixel-level.

6. The development environment of claim 3, wherein the desired placement of the user interface component is effected by drag-and-drop of the user interface component from at least one of a toolbox and a business object listing.

7. The development environment of claim 2, wherein the first computing device is one of a laptop, a pocket PC, a PDA, a Half-VGA, a Full-VGA, a mobile telephone, an electronic device, a desktop computer, and a server, and wherein the second computing device is one of a laptop, a pocket PC, a PDA, a Half-VGA, a Full-VGA, a mobile telephone, an electronic device, a desktop computer, and a server.

8. The development environment of claim 2, further comprising:
   a repository of a mobile application in which respective metadata associated with the respective first database, second database and third database are stored; and
   an application generator for reading the metadata to generate an application.

9. A method for generating at least one of a first user interface for a first computing device, a second user interface for a second computing device, and a generic user interface for the first and second computing devices, comprising:
   providing a user interface modeling process, the user interface modeling process including:
   receiving a first information representing a first display capability of the first computing device;
   receiving a second information representing a second display capability of the second computing device;
   as a function of the first information displaying a first indicator representing the first display capability and as a function of the second information displaying a second indicator representing the second display capability, where the first and second indicators are concurrently superimposed to show an overlapping region and a non-overlapping region of the first and second display capabilities when such regions exist;
   receiving a third information indicating a desired placement of a user interface component; and
   providing an application generation process, the application generation process including at least one of:
   comparing the first information with the third information, wherein if the desired placement of the user interface component complies with the first display capability, storing the third information in a first database, wherein the first database is used to generate the first user interface for the first computing device; and comparing the second information with the third information, wherein if the desired placement of the user interface component complies with the second display capability, storing the third information in a second database, wherein the second database is used to generate the second user interface for the second computing device; and comparing the third information with the overlapping region, wherein if the desired placement of the user interface component is in overlapping region, storing the third information in a third database, wherein the third database is used to generate the generic user interface for the first computing device and the second computing device.

10. The method of claim 9, wherein the first indicator and the second indicator are displayed as at least one of: a gridline; a device type information, a size information, an audio signal, a voice alert, a screen background color, a screen background shade, and a combination of these indicators.

11. The method of claim 10, wherein the first display capability and the second display capability are each configured by a respective at least one screen size parameter.

12. The method of claim 11, wherein the desired placement of the user interface component is effected by drag-and-drop of the user interface component from one of a toolbox and a business object listing.

13. The method of claim 9, wherein the desired placement of the user interface component is positionable by pixel-level.

14. The method of claim 9, wherein the first computing device is one of a laptop, a PDA, a pocket PC, a Half-VGA, a Full-VGA, a mobile telephone, an electronic device, a desktop computer, and a server, and wherein the second computing device is one of a laptop, a PDA, a pocket PC, a Half-VGA, a Full-VGA, a mobile telephone, an electronic device, a desktop computer, and a server.

15. The method of claim 9, further comprising:
a repository of a mobile application in which respective metadata associated with the respectively first database, second database and third database are stored; and
an application generator for reading the metadata to generate an application.

16. The method of claim 9, further comprising, during the application generation process, validating the metadata by the generator to insure the respective user interface is appropriate for the respective at least one of the first computing device and the second computing device.

* * * * *

UNITED STATES PATENT AND TRADEMARK OFFICE
CERTIFICATE OF CORRECTION

PATENT NO. : 7,577,912 B2
APPLICATION NO. : 10/402443
DATED : August 18, 2009
INVENTOR(S) : Govindan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Seventh Day of September, 2010

David J. Kappos
*Director of the United States Patent and Trademark Office*